US011191997B2

(12) United States Patent
Husemeyer et al.

(10) Patent No.: US 11,191,997 B2
(45) Date of Patent: Dec. 7, 2021

(54) EVENT DETECTION IN SPORTS (71) Applicant: Sportable Technologies Ltd., London (GB)

(72) Inventors: Peter Husemeyer, London (GB); Dugald MacDonald, London (GB); Daniel Davson, Cape Town (ZA); Alexander Mavros, London (GB)

(73) Assignee: Sportable Technologies Ltd., London (GB)

( * ) Notice: Subject to any disclaimer, the term of this patent is extended or adjusted under 35 U.S.C. 154(b) by 0 days.

(21) Appl. No.: 16/632,683

(22) PCT Filed: Jul. 23, 2018

(86) PCT No.: PCT/GB2018/052067
§ 371 (c)(1),
(2) Date: Jan. 21, 2020

(87) PCT Pub. No.: WO2019/016573
PCT Pub. Date: Jan. 24, 2019

(65) Prior Publication Data
US 2020/0246661 A1  Aug. 6, 2020

(30) Foreign Application Priority Data

Jul. 21, 2017 (GB) .................................. 1711808

(51) Int. Cl.
*A63B 24/00* (2006.01)
(52) U.S. Cl.
CPC ...... *A63B 24/0021* (2013.01); *A63B 24/0062* (2013.01); *A63B 2024/0025* (2013.01);
(Continued)
(58) Field of Classification Search
CPC .... A63B 2024/0025; A63B 2024/0028; A63B 2024/0071; A63B 24/0021
See application file for complete search history.

(56) References Cited

U.S. PATENT DOCUMENTS

| 8,231,506 B2 | 7/2012 | Molyneux et al. |
| 8,672,810 B2 | 3/2014 | Molyneux et al. |
| (Continued) | | |

FOREIGN PATENT DOCUMENTS

| WO | 2010/065886 | 6/2010 |
| WO | 2015/087164 | 6/2015 |

OTHER PUBLICATIONS

International Search Report and Written Opinion for PCT/GB2018/052067 dated Oct. 8, 2018.

*Primary Examiner* — Reginald A Renwick
(74) *Attorney, Agent, or Firm* — Christopher M. Scherer; DeWitt LLP (57) ABSTRACT

According to an aspect of the present invention there is provided a method of detecting and categorising an event occurring on a sports field, the method comprising: obtaining a series of ball and player position data measurements; determining a rotation rate of the ball device over the time period from data received from the ball device; determining the player is likely in possession of the ball based on a plurality of possession tests comprising: comparing a current position of the ball device and the player device to identify a relative distance between the ball device and the player device and calculating if the relative distance is lower than a reference value; comparing an obtained velocity of the ball device and the player device, respectively, to identify a relative velocity of the ball device with respect to the player device and calculating if the relative velocity is lower than a reference value; and, calculating if the rotation rate of the ball device is lower than a reference value; subsequently identifying a change in possession event based on the tests; categorising the event; and, outputting a notification of the event and its associated categorisation.

20 Claims, 5 Drawing Sheets

(52) U.S. Cl.
CPC .............. *A63B 2024/0028* (2013.01); *A63B 2024/0071* (2013.01)

(56) References Cited

U.S. PATENT DOCUMENTS

| | | | | |
|---|---|---|---|---|
| 2008/0088303 A1* | 4/2008 | Englert | .............. | A63B 24/0021 |
| | | | | 324/226 |
| 2009/0111582 A1* | 4/2009 | Schuler | ................ | A63B 71/00 |
| | | | | 463/42 |
| 2009/0256688 A1* | 10/2009 | Khan | ................ | A63B 24/0087 |
| | | | | 340/323 R |
| 2010/0030350 A1* | 2/2010 | House | ................ | G06K 9/00711 |
| | | | | 700/91 |
| 2010/0184563 A1* | 7/2010 | Molyneux | ................ | A43B 5/02 |
| | | | | 482/1 |
| 2011/0287878 A1* | 11/2011 | Englert | ................ | A43B 3/0005 |
| | | | | 473/570 |
| 2014/0266160 A1* | 9/2014 | Coza | ................ | G01V 3/08 |
| | | | | 324/207.11 |
| 2015/0379351 A1* | 12/2015 | Dibenedetto | ...... | H04N 5/44504 |
| | | | | 345/633 |
| 2016/0096071 A1 | 4/2016 | Ianni et al. | | |
| 2017/0161561 A1* | 6/2017 | Marty | ................ | H04N 5/23238 |
| 2018/0160943 A1 | 6/2018 | Fyfe et al. | | |

\* cited by examiner

EVENT DETECTION IN SPORTS

CROSS-REFERENCE TO RELATED APPLICATIONS

The present application is the U.S. national stage application of International Application No. PCT/GB2018/052067, filed Jul. 23, 2018, which international application was published on Jan. 24, 2019, as International Publication No. WO2019/016573. The International Application claims priority to British Patent Application No. 1711808.4, filed Jul. 21, 2017, the contents of which are incorporated herein by reference in their entireties.

BACKGROUND

Improvements in the technology for tracking players and sports objects on a sports field have led to increased usage of wearable and embedded technology for performance analysis and for training purposes. These wearable and embedded devices will hereafter be referred to as SMDs (Sports Monitoring Devices).

Many SMDs use the Global Navigation Satellite System (GNSS) to determine a player's position. GNSS has also been used to determine the position of the sports ball. The position of the player and their wearable device is determined using timing data obtained from a constellation of satellites around the Earth However, due to the relatively high mass of the electronics that are used (such as a printed circuit board, battery and a ceramic antenna), these systems have not gained traction for insertion within the ball.

The GNSS and player biometric data obtained by these SMDs is delivered to the end user in one of two ways: the data is either uploaded to a computer after the event for analysis, or it is offloaded from the player or ball during the event continuously, or in bursts, using a wireless protocol such as Bluetooth® or Wi-Fi®.

In large stadiums with many thousands of spectators, the SMDs which communicate using the BlueTooth®, Wi-Fi®, ISM and other frequency bands near 2.4 GHz and 5.0 GHz suffer from catastrophic connectivity issues. This phenomenon is partly explained by the fact that the spectators, also have devices such as cellphones, which communicate in these bands. The effect is that the stadium Radio Frequency (RF) environment is crowded, and the SMDs must compete with tens of thousands of cellphones for limited bandwidth. Consequently, transmission of data from the players is intermittent or fails entirely.

In addition to 'losing track' of the devices, interference is also known to affect calculations. The accuracy and reliability of systems has not been sufficient for proper determination of events occurring on a sports field.

Recently Ultra Wide-Band (UWB) transceivers operating between 3.0 GHz and 7.0 GHz have become commercially available. Communication in these bands is unaffected by the RF environment generated by the personal devices of spectators in the stadium. The use of these UWB transceivers therefore allows real-time transmission of the data from the players to the receivers located near the field. Furthermore, due to the high bandwidth available, UWB can also be used to locate the players using methods such as multilateration. An example of such a UWB system is described in GB 2541265.

The use of UWB allows the player's biometric data and location to be transmitted in real-time, even in a crowded stadium environment. However, on its own, real-time tracking of the players is insufficient to perform a tactical analysis of the game. To gain tactical insight into the game, the motion of the ball must also be captured in real-time and this capability has heretofore not existed in rugby.

The sport of rugby introduces a degree of complexity not known to other sports. There are often multiple players legally close to the ball such that it is difficult to determine which player is in possession of the ball, and the ball may legitimately travel close to the player without the player being in possession of the ball. Furthermore, the options available to the player to both legally and illegally give away or lose possession of the ball are more numerous when compared to more simple games such as basketball, netball or soccer where typically a ball can be considered to be possessed based on relative location and then passed based on a change in relative location.

It has previously been considered to use video analysis to identify and track events within rugby but such a system is not capable of accurately identifying possession and subsequent events due to the crowded environment of the rugby field and the speed and accuracy of processing.

One solution for overcoming the above deficiencies is described in US20090048039 and US20140067098, which cross-references the former application. These systems describe that a data logger positioned on the player is able to determine that the player is in possession of the ball by detecting a short-range signal broadcast by the ball such that the data logger on the player determines that the ball is in the vicinity of the player and therefore that player is in possession of the ball. The identification that the player is in possession of the ball is subsequently reported by the data logger to a central server.

Similar systems suffer from many of the deficiencies noted above. Principally, the systems are unable to accurately identify player possession when multiple players are within the same vicinity. The systems propose a short range beacon which indicates possession of the ball to a single data logger and a long range beacon to indicate proximity to play to a secondary data logger. The beacons utilise radio frequency signals at a frequency which is not attenuated by the body of the players, and therefore cannot accurately determine which player is in possession of the ball.

Additionally, similar systems are unable to accurately determine the event which subsequently occurred should the ball have left the vicinity of the data logger. The systems propose alternatives to identify an impact on the ball and therefore that the ball has been kicked, such as a pressure pad, piezo transducer arrangement or by detecting beacon interruption due to impact. US20140067098 describes plotting positional data and other player data onto a graphical sports field. However, there is no viable solution proposed to accurately categorise the array of possible events in a rugby game.

There currently exists no available solution to categorise an event occurring on a sports field and to accurately track and monitor which player is in possession of the ball.

There has also been a trend in global sport to utilise technology in officiating sporting contests. There is an acceptance from the public and from officials that technology, when utilised correctly, can provide greater certainty of decision making. Examples include hindsight video analysis in American Football and Rugby Football and goal-line technology used in football (or soccer) to identify if the ball has crossed the goal-line. Currently employed options for implementing goal-line technology include video analysis and also sensors placed within the ball and in the goal area which detect if the ball has crossed the plane of the line.

The key requirements for technology when used in officiating are accuracy and reliability. At present, systems that utilise wearable technology are unable to provide the necessary accuracy, reliability and tracking of the full range motions to enable the technology to be used in officiating. Wearable technology has only recently been able to determine positional accuracy to around 15-20 cm, which is still not sufficient to determine rule infringement reliably. Moreover, the data must be provided in real-time. At present, wearable devices suffer significantly from noise in sporting stadiums resulting from the large number of interfering signals and are unable to reliably retrieve real-time data from the devices.

To accurately provide data for officiating, it is essential that an infringing event such as a forward pass, is accurately, reliably and quickly determined and notified. Existing systems are unable to accurately identify and categorise each event, let alone identify a complex infringing event such as a forward pass.

SUMMARY OF THE INVENTION

The present invention relates to a method and system that tracks sports players and the ball in real-time, preferably for rugby. The method and system make real-time decisions using classification algorithms based on tests of sensor data. The ability to perform real-time classification allows particular "moves" or events to be determined on the fly, and also allows the system to quantify and analyse passes, kicks, missed opportunities, missed tackles and more. Underpinning the operation of this real-time event monitoring method and system is the possession detector which determines which player is in possession of the ball and how they cause the ball to leave their possession.

According to a first aspect of the invention there is provided a method of detecting and categorising an event occurring on a sports field. The method comprises: obtaining a series of ball position data measurements over a time period from a ball device embedded within a sports ball, each measurement in the series being recorded and associated with a time at which it was measured; obtaining a series of player position data measurements over a time period from a player device attached to a sports player, each measurement in the series being recorded and associated with a time at which it was measured; determining a rotation rate of the ball device over the time period from data received from the ball device; determining the player is likely in possession of the ball based on a plurality of possession tests comprising: comparing a current position of the ball device and the player device to identify a relative distance between the ball device and the player device and calculating if the relative distance is lower than a reference value; comparing an obtained velocity of the ball device and the player device, respectively, to identify a relative velocity of the ball device with respect to the player device and calculating if the relative velocity is lower than a reference value; and, calculating if the rotation rate of the ball device is lower than a reference value; subsequently identifying a change in possession event based on the tests; categorising the event; and, outputting a notification of the event and its associated categorisation.

In this way, time-series data is used to detect and categorize events relating to the players and the ball, centrally, in real-time. The categorization begins with a PDA (Possession Detection Algorithm) which determines the state of the ball at any given moment in time. The ball is either in a player's possession or it has left a player's possession through some means. The method utilises a plurality of tests to identify if the player is in possession of the ball such as relative velocity to determine if the player and ball are moving together and rotation rate or angular velocity, which can be used to indicate that the ball is possessed and not travelling through the air as when held, the rotation rate will be lower than when in the air or bouncing and especially lower than following a pass or kick.

The velocity may be calculated from the ball and player position data measurements or obtained from an inertial measurement unit embedded in the ball device or player device. Similarly, the rotation rate can be calculated from data received from an IMU or from monitoring changes in an orientation vector determined from radio signals received at pitch side.

Preferably the step of categorising the event may be based on a plurality of loss tests, comprising: comparing a current position of the ball device and the player device to identify a relative distance between the ball device and the player device and calculating if the relative distance exceeds a reference value; comparing an obtained velocity of the ball device and the player device, respectively, to identify a relative velocity of the ball device with respect to the player device and comparing the relative velocity to a reference value; calculating if the rotation rate of the ball device exceeds a reference value; calculating if a magnitude acceleration value exceeds a reference value; and, calculating if an elevation position of the ball device is lower than a reference value. Acceleration may be obtained from the position data or from an accelerometer of an inertial measurement unit embedded within the ball or both. If both are used, the data may be more accurate or errors compensated for in calculations. It will be understood that where the term elevation position is used, the method may consider a change in elevation position.

The loss tests each contribute to evaluating which event caused the player to lose possession of the ball. Conventionally, each event is determined by evaluating a single parameter transmitted by a wearable device on the player or by separately considering a parameter transmitted from a sensor within the ball. The calculation of events by considering multiple tests, comprising relative tests, improves the accuracy and efficiency of the event categorisation. All complex events possible within a Rugby game can be categorised and output in a manner which was previously not possible.

The step of determining which player is likely in possession of the ball may further comprise: performing the plurality of possession tests to generate a set of possession parameters; applying a weight to the parameters generate a set of weighted possession parameters; and, combining the weighted possession parameters; and, comparing the combination against a reference value to determine that the ball is possessed by the player. Each weight may be configurable and optimised to increase the accuracy of determining probable possession and categorising it accordingly. By weighting each test in this way, the likelihood of that test indicating a positive possession determination impacts the overall conclusion to improve the accuracy of the determination.

Additionally, the step of categorising the event may further comprise: performing the plurality of loss tests to generate a set of loss parameters; applying a weight to the parameters generate a set of weighted loss parameters; and, combining the weighted loss parameters; and, comparing the combination against a plurality of reference value to determine a likely event. As with the step of determining the player is likely in possession of the ball, each weight may be configurable and optimised to increase the accuracy of determining a probable event and categorising it accordingly. By weighting each test in this way, the likelihood of that test indicating a positive possession determination impacts the overall conclusion to improve the accuracy of the determination.

Preferably, the plurality of possession tests may comprise: calculating a player stride rate by monitoring changes in magnitude of acceleration of the player device; calculating an estimated player stride rate by monitoring changes in magnitude of acceleration of the ball device; and, comparing the player stride rate to the estimated player stride rate. Calculating stride rate in this way allows the method to improve the accuracy of determining that a player is in possession of the ball. If the stride rate of the player matches impulses caused in that ball by the stride rate then it is likely that player holds the ball. A different estimated stride pattern derived from movement of the ball to the stride pattern of the player implies that the movement of the ball is being caused by a different player.

Additionally, the step of monitoring changes in magnitude of acceleration of the player device and the step of monitoring changes in magnitude of acceleration of the ball device, may each comprise receiving data from an inertial measurement unit of the player device and ball device, respectively. An inertial measurement unit provides for quick and efficient data for the inputs to the tests, such as acceleration or velocity.

Preferably, the step of determining a rotation rate may comprise receiving data from an inertial measurement unit of the ball device. The IMU may comprise a gyroscope and accelerometer such that the IMU is operable to transmit the rotation rate via a UWB transceiver. The accuracy of the rotation rate is therefore improved. Alternatively the rate may be calculated from a change in orientation vector of the devices.

Optionally, the method may further comprise obtaining air pressure data measurements from a barometer of the ball device, wherein the plurality of loss tests further comprise calculating if the air pressure exceeds a reference value. The monitoring of air pressure and using the air pressure as a test to the input to determine a loss event allows for the categorisation of a kick to be improved using sensors included within the ball. When air pressure increases a kick is statistically more likely to have been the event that caused the loss of possession.

The step of calculating if the relative distance is lower than a reference value may preferably comprise applying an offset to the reference value representative of a sphere around the player device and the ball device such that a virtual sphere of influence is created around each device and wherein the virtual spheres overlap if the relative distance is less than a sum of the radii of the two spheres and the reference value. In this way the ball may be considered to be possessed by the player even if there are errors in the measurements. Moreover, the player may influence the ball within, for example, the extent of the arms with the device positioned on the back. The player has a proximity from the device within which it may control the ball and the ball itself has a widest periphery a certain distance away from the ball device.

The method may preferably comprise receiving a plurality of series of player position data measurements over a time period from a plurality of player devices each attached to a respective sports player, each measurement in the series being recorded and associated with a time at which it was measured, wherein the possession tests comprise comparing a current position of the ball device and each player device to identify a respective relative distance and calculating if the respective relative distance is lower than a reference value. By comparing multiple distances, the possession tests are able to factor in that multiple players may legitimately be close to the ball in the game of rugby, such as in a ruck, maul or scrum.

Most preferably the position data measurements are determined from an ultra-wide band signal sent between the player device and the ball device respectively and a plurality of antenna arranged around a periphery of the sports field. In this way the accuracy of the measurements is ensured and the position data unaffected by interference in the stadium. Data may be subsequently sent to, and received by, an antenna arrangement at the periphery of the sports field. The position may be determined by one or more of triangulation, trilateration and multilateration.

Optionally, the step of determining the player is likely in possession of the ball may comprise a statistical probability of possession based on the plurality of possession tests. The method considers in real-time the effects of noise and data anomalies on event detection and infers a statistical likelihood. This is an improvement on the art which are typically based on event triggers or positive determinations which are affected by issues in the real world. The statistical approach is a realistic weighing of several likely indicators to build a probability of categorisation or possession.

In one embodiment, the step of categorising the event may comprise determining a pass event indicated by: an intermediate level relative velocity above a first reference value and below a second reference value; a rotation rate above a reference value; a magnitude of acceleration above a first reference value and below a second reference value; and, an elevation position of the ball device being above a reference value.

In another embodiment, the relative velocity may be a vector and in which the step of categorising the event further comprises comparing a direction component of the relative velocity vector to a reference value. Preferably the component of the relative velocity vector is taken along a unit vector which is parallel to the touchline and in a direction of the opposing team's dead ball line. Optionally, the direction is perpendicular to the half-way line of the pitch. In one example, the reference frame of the pitch is set with the y-axis being the half-way line. Preferably the x-axis is perpendicular to the y-axis (half-way line).

In an example, the step of categorising the event further comprises determining a forward pass event indicated by: a direction component of the relative velocity vector being above a reference value, the component of the relative velocity vector being taken along a unit vector which is parallel to the touchline and in a direction of the opposing team's dead ball line.

Reliable officiating has previously been impossible as it has not been possible to accurately determine whether a pass has travelled forward. Even with the use of video analysis, it has proven difficult to identify whether the pass is forward due to errors caused by viewing angle and also due to the element of momentum caused by movement of the player on the travel of the ball. By comparing the relative velocity vector of the ball device to the relative velocity of the player device, it becomes possible to accurately, and in real-time, determine whether a pass is legitimate in such a complex game as rugby.

In another embodiment, the method may further comprise receiving a plurality of series of player position data measurements over a time period from a plurality of player devices each attached to a respective sports player, each measurement in the series being recorded and associated with a time at which it was measured, and wherein the step of categorising the event may comprise determining a taken event indicated by: a relative distance of each of a first and second player device and the ball device being lower than a reference value at a first time; the relative distance of the second player device being higher than a reference value and the relative distance of the second player device being lower than a reference value at a second time later than the first time; and, the relative velocity of the ball and the first and second player devices being below a reference value at the first and second times.

In another embodiment, the step of categorising the event may comprise determining a kick event indicated by: a relative velocity above a reference value; a rotation rate above a reference value; a magnitude of acceleration above a reference value; and, an elevation of the ball device being above a reference value.

In another embodiment, the step of categorising the event may comprise determining a drop event indicated by: an elevation of the ball device below a reference value; a relative velocity below a reference value; and, a magnitude of acceleration above a first reference value and below a second reference value.

In another embodiment, the step of categorising the event may comprise determining a drop-kick event indicated by: at a first time: an elevation of the ball device below a reference value; a relative velocity below a reference value; and, a magnitude of acceleration above a first reference value and below a second reference value; and, at a second time later than the first time: a relative velocity above a reference value; a rotation rate above a reference value; a magnitude of acceleration above the second reference value; and, an elevation of the ball device being below a reference value.

According to a further aspect of the invention there may be provided a system to detect and categorise an event occurring on a sports field, the system comprising: a ball device comprising an antenna connected to a respective transceiver, the ball device configured to be embedded within a sports ball; a player device comprising an antenna connected to a respective transceiver, the player device configured to be embedded within sports equipment worn by a player on the sports field; an analytics controller configured to: detect signals transmitted between the antenna of each device and an antenna arrangement comprising three or more antennas, each antenna arranged around a periphery of the sports field; evaluate the time taken for signals to travel between the antenna of each device and the antenna arrangement; measure position data of the device relative to the antenna arrangement based on time taken; and, send the position data measurements to an analysis server; and, an analysis server configured to perform the method of the first aspect.

The system may further comprise the antenna arrangement.

Preferably, the antenna of each device and the antenna arrangement may be associated with an ultra-wide band transceiver.

More preferably, each device may further comprise an inertial measurement unit (IMU) and the analytics controller may be further configured to determine acceleration and rotation using signals generated by the IMU.

The antenna arrangement may comprise a plurality of antenna arrays each comprising a plurality of antennas. The antenna arrangement may comprise at least 10 antenna arrays each comprising at least 1 antenna. The antenna arrangement and associated transceivers may together be configured to transmit a signal from each antenna, the analytics controller being configured to detect signals received by the antenna of the electronic device. The position data measurements may be determined relative to a reference frame generated by the antenna arrangement.

The electronic device may further comprise a control unit and a power supply.

According to a further aspect of the invention there may be provided a computer readable medium comprising instructions which, when executed by a processor, cause the processor to perform the method of the first aspect.

DETAILED DESCRIPTION

Examples of systems and methods in accordance with the invention will now be described with reference to the accompanying drawings, in which.

The following are examples of systems and methods for detecting events in complex sports such as Rugby Football. The principles are also applicable to American Football, Soccer and other sports. It will be understood of course that the following are merely examples. The principles described are usable for performance analysis and training purposes as well as officiating.

More specifically the exemplary concepts relate to a set of wearable devices on the players, devices embedded into the ball, and a set of side of field devices which enable real-time detections to be made with high accuracy and precision.

In the described detailed example, the wearable devices use ultra-wide band (UWB) transceivers. These devices make it possible to determine of the location, velocity, acceleration and angular orientation of the player while measuring the direction, magnitude and location of the static and dynamic forces experienced by the player. The wearable devices may also include a 9-axis Inertial Measurement Unit (IMU) to allow for the location, velocity, acceleration and angular velocity components to be determined.

Figure 1:
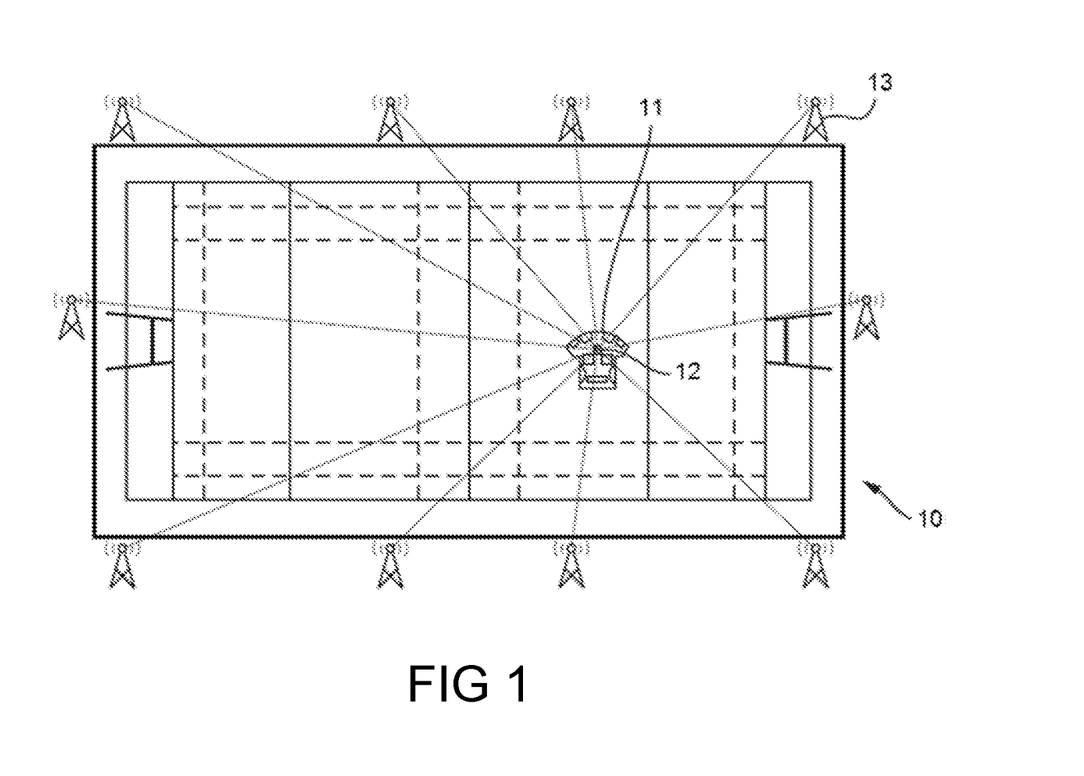
FIG. 1 shows a high-level diagram of a system of the present invention.

As mentioned, an UWB transceiver and a 9-axis Inertial Measurement Unit (IMU) may optionally be embedded within the rugby ball to allow for the location, velocity, acceleration and angular velocity components of the ball to be determined. These devices may broadcast their data in real-time to equipment at the side of the field. At the side of the field is arranged a set of antenna arrays. FIG. 1 illustrates a rugby pitch 10 on which is positioned an article of body armour 11. Positioned around the pitch 10 are a series of antenna arrays 13 or anchors. The terms antenna array and anchor will be used interchangeably throughout the present description. FIG. 1 illustrates a device embedded within body armour to be worn by a player as is typical in Rugby Football. A ball may also include a similar device embedded within its interior. As will be understood, should the system and method described herein be utilised in another sport, then the means for attaching the device to the player may be different such as a harness or shirt attachment.

A central server (not shown) is used to process the data channelled from the players and equipment via the receivers. Throughout the present description the terms analytic controller, central server and microcontroller will be used to describe processing units which perform certain functions. It will be understood that the terms used are not essential. What may be essential is the functionality described. However, the functionality may often be performed by processing and control units located remotely, within the described entities or elsewhere in the system as appropriate.

Embedded within the body armour 11 is an electronic device 12 which includes an antenna and an ultra-wide band (UWB) transceivers. For position detection, one antenna and transceiver may be present but for orientation detection, multiple transceivers may be present.

A similar device may also be embedded in other equipment such the ball or training equipment. The UWB transceivers in the electronics device transmit a narrow pulse in the time domain, or 'chirp', which is detected by the antenna arrays at different times. The arrays, which contain at least one UWB transceiver and an antenna array, perform Angle of Arrival (AoA), Time Difference of Arrival (TDoA) and Time of Arrival (ToA) calculations to determine the player's position. The principles behind AoA, TDoA and ToA are well known and will not be described in detail here.

The antenna arrays 13 may each also transmit a narrow pulse in the time domain, or a 'chirp', which is detected by the UWB transceivers on the device at different times. From this latter measurement the device may be able to determine its orientation to high accuracy.

As above, each electronic device 12 for positioning on the field comprises two or more antennas spaced apart by a predetermined distance. The time taken for a signal to travel between the antenna at the side of the field and the antenna on the device is proportional to the distance between the antennas (calculated by knowing the speed of travel of the signal). To determine position, multiple signals can be compared to trilaterate and/or multilaterate the position once the relative positions of the fixed antennas are known. To determine orientation, the difference in distance between the two antennas on the device may be used as a constant in the calculations. Other constants include the speed of light and the speed of the travel of the signal in the electronics. The time that the signals arrive at each antenna is a function of the orientation of the device.

The system is capable of measuring the position of the players and their orientation with respect to a convenient set of coordinate axes. In this example the orientation data is determined from a combination of the data from Angle of Arrival (AoA) calculations and data from a 9-axis IMU which is also housed in the device. The relationship between the coordinate axes for the player and the field can be represented in different ways, which may include Euler angles or a quaternion representation.

As described above, the antenna array may comprise at least one antenna and UWB transceiver. Each antenna array may be connected to the others wirelessly or through fixed or wired communications. Each antenna array may also be connected solely to a master array which gathers together data from each array and instructs each array to act. The master array may be connected to a server or the server may act as the master and coordinate the arrays.

The master array may also function to set the reference coordinates to (x,y,z) (0,0,0). Thus the reference frame against which the orientation of the device is determined is set by the master array. The coordinates of the reference frame are then based on the position of other arrays. In order to determine the reference frame for position and orientation, more than one point is needed. Each array position is determined relative to each other and then positioned on the frame, all relative to the master. The position and orientation of the device can therefore be considered to be relative to the frame generated by the arrays. The origin may be placed anywhere on or around the pitch, but preferably the y-axis is placed at the halfway line. The other side of the halfway line would therefore be, for example, (0, 70, 0).

Exemplary sports equipment which is designed to communicate with the antenna arrays will now be described. The sports equipment has a transceiver, antenna and a microcontroller.

The UWB transceiver on the equipment communicates with the arrays. Chirps received by the anchors, from the sports equipment, are used to perform time difference of arrival (TDoA), time of arrival (ToA) and angle of arrival (AoA) calculations to locate the position and orientation of the sports equipment with high accuracy. Analysis of the chirps may also used to determine the angular orientation of the sports equipment with respect to a convenient set of reference coordinate axes. In this manner the position and orientation of the sports equipment can be determined to high accuracy.

The devices may have at least one 9-axis IMU for collecting linear acceleration, angular acceleration and orientation data. The IMU component optionally embedded in the devices includes a combination of accelerometers, gyroscopes and magnetometers to report characteristics over time using the ultra-wide band (UWB) transceiver on the device. Data from the IMU can be combined with the data calculated by the side of field equipment, which constitutes a form of sensor fusion, to increase system robustness. The IMU may also be used to calculate the angular velocity components, and therefore the revolutions per minute, of the ball or player device.

On the player there is an electronics unit which may in this example have two antennas. If a vector is drawn between these two antennas, its direction can be determined with respect to the reference frame generated by the side of field equipment by performing AoA calculations. However, if the electronics unit, containing the two antennas, is rotated about this vector, this rotation is indeterminate, since the direction of the vector is unchanged.

The sports equipment preferably comprises a control unit, for example comprising a microcontroller. The sports equipment preferably includes a power supply to supply electrical power, for example to those sensors which require power to operate as well as to the components of the control unit. A lithium ion polymer battery may be used. The power supply may be provided on the same part of the sports equipment as the sensors but this is not essential. For example, where the sports equipment comprises body armour the power supply may conveniently also be located on the body armour. However, this is not essential and the power supply may instead be located elsewhere on the wearer of the body armour.

The control unit and power supply may be provided in an electronics unit or device. Where the sports equipment is a rugby ball, the electronics unit could be located inside the ball. Where the sports equipment is body armour, the electronics unit may be located in a position corresponding to a point between the player's shoulder blades, which is already common practice for devices which use GNSS enabled chipsets for location.

As described above, the exemplary system comprises a device to be located on the field on either the player or in some other equipment and a set of antenna arrays positioned around the field. From data packets sent between the arrays and the device, the system is able to determine position and orientation of the device by analysing the ultra-wide band signals and determining AoA, TDoA and ToA and combining this with IMU data generated on the device. The intelligence to perform this analysis may be spread across each node or may be performed centrally at a central server. The data may be logged in a database for subsequent retrieval and analysis.

Figure 2:
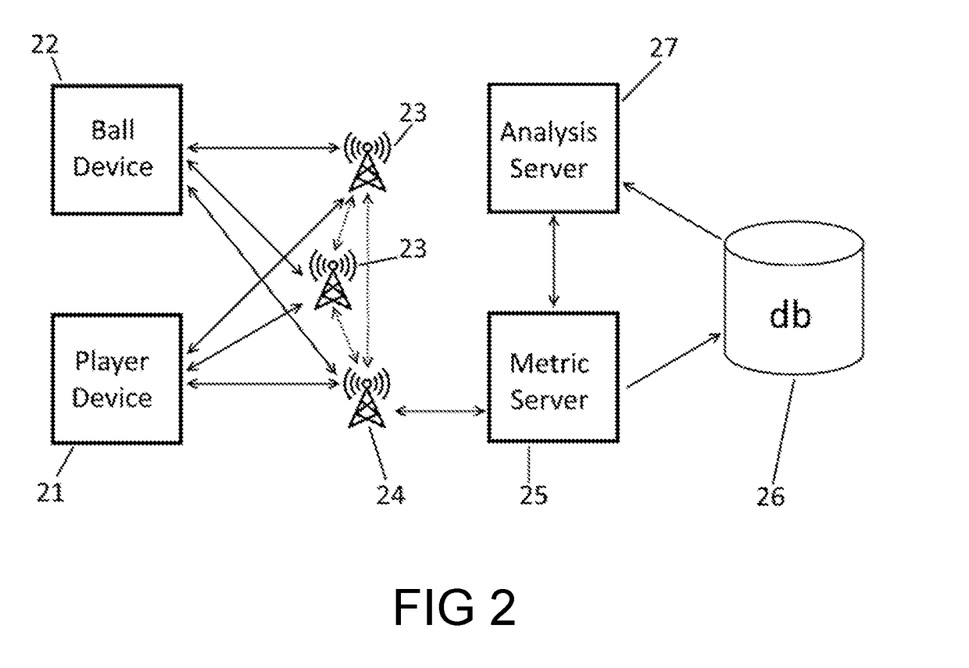
FIG. 2 shows a schematic block diagram of an example system according to the present invention.

To determine the players' and the ball's positions, a number of radio-beacons are installed around the perimeter of the field. FIG. 2 illustrates a block diagram 20 of the arrangement. Each player wears a device 21 and the ball has an device 22 built into it. The terms electronic device, Sports Monitoring Device (SMD), wearable, and embedded device are used interchangeably. During normal operation, the locations of the devices 21, 22 are determined by the radio-beacons at a rate of, for example, 20 measurements per second (20 Hz). Again, as will be understood, the terms beacons, radio-beacons, anchors and antennas signify the apparatus installed around the periphery of the field and are used interchangeably.

Similarly, for example, at a rate of 20 Hz, the devices offload the data generated by their IMUs, heart-rate monitors, force-transducers etc. to the radio-beacons 23. The data received by the radio-beacons 23 is timestamped and relayed to a master beacon 24 which sends the acquired data to a server 25 located near the field.

The data received by the server 25 then passes through a "metric server" which uses robust filtering algorithms to filter out impulse noise and to smooth the data. The specific filtering and smoothing algorithms are not of the essence of this invention and will be known to those skilled in the art. The metric server 25 uses the smoothed data to derive other quantities such as the velocity and acceleration of the players and the ball and the rate of rotation of the ball (measured in RPM), among other quantities.

The metric server then passes the conditioned and derived data into a database 26. After one second of data has been recorded the database will contain, for each device, 20 entries for time, X-position, Y-position, Z-position, and likewise for the other degrees of freedom from the accelerometer, gyroscope, magnetometer, heart rate monitor, force-transducers and the derived metrics. An analysis server 27 may be provided which retrieves and analyses the data in the database. Of course it will be understood that the analysis may be provided by the metric server 26 or the master beacon 24 which may itself act as an analytics engine.

This time-series data is used to detect and categorize events relating to the players and the ball, in real-time. The categorization begins with a PDA (Possession Detection Algorithm) which determines the state of the ball at any given moment in time. The ball is either in a player's possession or it has left a player's possession through some means (discussed below in the Loss Detection Algorithm) or it is in an indeterminate state (the ball has been replaced by a new ball, or is lying idle on the ground).

A second algorithm, the LDA (Loss Detection Algorithm) receives input from the PDA and detects the changes in possession and categorizes the reason for the change in possession. Possession of the ball can change through five primary means:

a) The player can pass the ball (in any direction to any other player, even on the opposing team).

b) The player can kick the ball.

c) The player can drop the ball.

d) The player can have the ball taken from them (by members of their team or the opposing team).

e) The ball can enter into another player's possession through an indeterminate sequence of events (stopped play, handed to player by touch judge or referee, a new ball is brought onto the field etc.).

To determine possession, the example method uses a weighted combination of possession tests. The possession tests use the time series data from the database which was gathered by the hardware in real-time. The weights assigned to these tests may be hardcoded or they can be learned using a machine learning algorithm based on training data. This is not of the essence of the invention.

Figure 3:
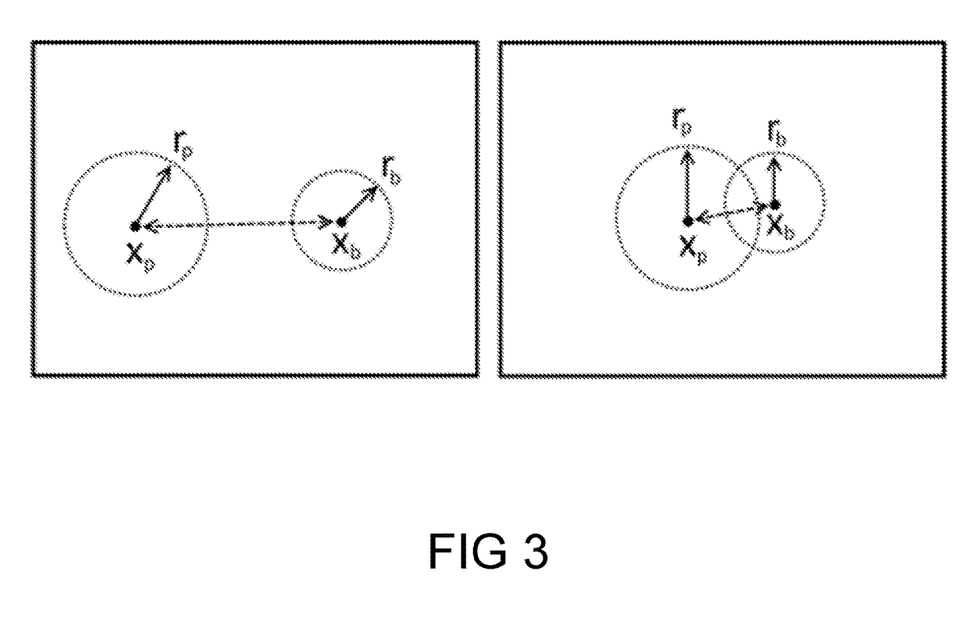
FIG. 3 shows an illustration of the sphere of influence concept of an embodiment of the invention.

The first test is to examine in which player's "sphere of influence" the ball resides. Using the time-series position data for each player and the ball, a sphere of radius $R_b$ is created around the ball and a sphere of radius $R_{pi}$ is created around each player for $i \in [1, N]$ where N is equal to the number of players on the field. The algorithm then checks each player to determine if their sphere of influence overlaps with the ball's. The spheres overlap if the following inequality holds true:

$$(x_p-x_b)^2+(y_p-y_b)^2+(z_p-z_b)^2-(R_p+R_b)^2<0$$

The inequality says that the spheres overlap if the distance between the player and the ball is less than the sum of the radii of the two spheres of influence. This inequality effectively measures whether the ball is within reach of a specific player.

In other words, the relative distance between the player device and the ball device is compared against a reference value. Here, the reference value is offset by a virtual radius value surrounding the devices. That is, if the distance between the device and the ball is less than a reference plus the distance the player and ball extend away from the device when in situ, then it can be assumed that the player and device can possibly be associated and that the ball is potentially within the possession of the player, that is, within their reach.

In the art, the ball typically notifies a local data logger that it is within the vicinity. The method of this example provides that the influence of the player and the possibility of possession be tailored according to the sport and the requirements, or even to the particular sportsman. In Rugby, possession is typically where the ball is held by the player. One may consider that the ball can only be in the player's possession if the ball's position coincides with the player's, but there exists measurement error, and the ball may be held at arm's length and accordingly a virtual sphere around the player device is created. In essence, if the ball is far from the player then it cannot be in his possession. A test is proposed whose parameters (the two radii) can be refined and optimised. Moreover, all calculations are performed remotely and communications between the ball and player are not required.

FIG. 3 illustrates this concept figuratively in one dimension only. As illustrated, the player radius may be larger than the ball radius. The distance between the devices may be a positive distance but the device may be considered to be within an overlapping sphere of influence as the radii of the spheres is factored into the inequality. That is, the distance is less than the sum of the radii.

The above example considers that each player device is considered in isolation. However, with multiple players on a pitch, there is a potential for error. The example considers that every player may have its sphere of influence considered. Alternatively only certain candidate players may be considered for processing efficiency.

If the ball is within reach of more than one player then the test, that is, the relative distance compared to a reference value, may fail and instead the 'sphere of influence' test may indicate that there may be a scrum, maul or ruck happening. Effectively, the test may conclude that there may be a contest for the ball. A failure of the test indicates that the test is inconclusive or that the there is a statistical improbability of possession.

Nevertheless, since the possession test is combined with additional tests in a weighted combination, the possession detection algorithm may be able to determine which player of multiple potential players has possession of the ball or that none is the most likely conclusion.

The second test uses the player's velocity vector $\vec{V}_p=[v_{px}, v_{py}]$ and the ball's velocity vector $\vec{V}_b=[v_{bx}, v_{by}]$. The relative velocity between the player and the ball is:

$$\vec{V}_{rel}=\vec{V}_b-\vec{V}_p=[v_{bx}-v_{px},\ v_{by}-v_{py},\ v_{bz}-v_{pz}]$$

The magnitude of the relative velocity is $$|\vec{V}_{rel}|=\sqrt{(v_{bx}-v_{px})^2+(v_{by}-v_{py})^2+(v_{bz}-v_{pz})^2}$$

If the ball is within the player's sphere of influence and the magnitude of the relative velocity is large, then the ball is moving quickly relative to the player and this may indicate that the player has made a pass or even that the ball is just momentarily passing through the player's sphere of influence. However, if the magnitude is small and lower than a pre-set tolerance or reference value, then the ball is not only within reach of the player, but is also moving at the same rate as the player. This is an indication that the player might be in possession of the ball.

The velocity may be calculated from the ball and player position data measurements or received from the IMU. It is contemplated that the algorithm may compare the magnitude of the relative velocity at a time instant, the relative velocity at a time instant, or a change in relative velocity over a time period to determine if the ball is moving together with the player and is likely in possession.

This test may be combined with the sphere of influence test, because the ball could actually just be flying past the player. The player might never touch the ball, but it flew past him and entered his sphere of influence.

If the player's velocity and the ball's velocity are within a set tolerance, then this combined with the sphere of influence is a good indication of possession. The tolerance value or reference value may be optimised to increase the statistical likelihood of possession.

The third test of this example is that of angular velocity, rotation rate or frequency of rotation. When the ball is in a player's possession, the ball is held by the player and is therefore not rotating or minimally rotating. Data from the 3-axis gyroscope, in the ball's IMU, may be used to determine the angular velocity of the ball in RPM (revolutions per minute). If the ball has a constant RPM then this is a good indication that the ball is not in any player's possession and is travelling through the air. Alternatively, or additionally, one could measure the angular velocity by looking at the rate of change of the orientation vector. The orientation vector determined using the time of arrival calculations described above.

In this test, the angular velocity is compared to a reference value. If the angular velocity is below a threshold, it is statistically more likely that the player is in possession of the ball.

If the ball is spinning, it cannot be held in a player's hands. As the player runs the ball will rotate slightly in one direction, then in another, and then in another. These random small rotations may average out, in the sense that when you integrate them the areas above the axis cancel with the areas below the axis.

However when the ball has been passed or kicked it will rotate or tumble in a non-random and continuous way. These rotations will not average out and are a very good indication that the ball is NOT in any player's possession.

Therefore, in a further test, the angular velocity over time may be compared to a predetermined profile, or a change in angular velocity considered. Random fluctuations may indicate possession whereas a consistent profile may indicate travel without influence of a player.

In this example, a preferable fourth test considers the pedometry of the player, that is, the relative magnitudes of acceleration is considered against a reference value. As described, the devices, all have IMU's on-board. Therefore, the players and the ball all generate data from their 3-axis accelerometers. The magnitude of the player's acceleration, as measured by the accelerometer, can be expressed as:

$$|\vec{A}_p|=\sqrt{a_{px}^2+a_{py}^2 a_{pz}^2}$$

The magnitude of the ball's acceleration as measured by the ball's 3-axis accelerometer can be calculated in a similar fashion. The magnitude of the player's acceleration can be used to determine the player's stride rate. This technique is well known to those skilled in the art. If the player is in possession of the ball, the player's strides will be transmitted through the ball as impulses which appear in the data from the ball's accelerometer. The player's stride rate can therefore be calculated from the magnitude of the ball's acceleration data. If the two stride rates are within a pre-set tolerance then this is another indication that the player may be in possession of the ball.

This fourth test increases the statistical likelihood of possession. The acceleration data could optionally be derived from the position data over time rather than the accelerometer.

The fourth test compares two estimated stride rates, derived from acceleration data, against a tolerance or reference value to determine similarity.

If the ball is initially in a player's possession, as determined by the aforementioned algorithm, the ball can be caused to leave that player's possession (lost) through at least five mechanisms which were delineated above. As a reminder, these are:

a) The player can pass the ball (in any direction to any other player, even on the opposing team).

b) The player can kick the ball.

c) The player can drop the ball.

d) The player can have the ball taken from them (by members of their team or the opposing team).

e) The ball can enter into another player's possession through an indeterminate sequence of events. (stopped play, handed to player by touch judge or referee, a new ball is brought onto the field etc.).

To categorize the mechanism by which the ball was caused to leave the player's possession, a loss detection algorithm is used. The algorithm uses a weighted combination of the following tests. These weights may be hardcoded or they may be learned through a machine learning process using training data. The method by which these weights are obtained are not in the essence of the invention.

In one example, the possession calculation is repeatedly determined, for example 20 times per second. If the possession has changed, then the loss detection algorithm may be triggered. The calculation may determine that player A has the ball and subsequently it will say no-one or someone else has it. Accordingly, a loss is determined and the loss detection algorithm is triggered.

The possession algorithm determines possession as a statistical likelihood, 19 out of 20 is good indication. The calculation may determine that player A has the ball 19 out of 20 and once that no-one has it, for example. When the possession algorithm indicates that the player is no longer in possession it triggers a loss of possession. In preferred examples the loss of possession must be persistent to be statistically significant.

That is, a single loss of possession determination amongst a series of positive possession determinations may indicate a statistical anomaly or a probability that a positive possession determination is still the most statistically likely. However a negative possession determination over a series of possession determinations indicates a likely loss event such that the loss detection algorithm may be triggered.

The first test considers the sphere of influence, that is, the relative distance test, in a similar manner to the possession test above. If the ball is initially in a player's possession and it then leaves that player's sphere of influence then this is a good indication that the ball may have been passed, kicked, dropped, taken or lost through an indeterminate mechanism. However, the ball should leave the player's sphere of influence.

The sphere of influence test can also be used to determine if the ball was taken from the player, rather than passed, kicked, dropped or lost indeterminately. For example, for the ball to be taken from a player, another player must enter into the same sphere of influence. If that player and the ball then leave the initial player's sphere of influence, then the ball was taken with some certainty.

The second test is relative velocity. The rate at which the ball leaves a player's possession is an important indicator of which mechanism caused the ball to leave that player's possession. If the relative velocity between the ball and the player is large, then this may indicate that the ball was kicked, rather than passed, dropped, taken, or lost through an indeterminate sequence of events.

Alternatively, if the relative velocity is intermediate and between lower and upper cut-off velocities, or threshold or reference values (which are either pre-set or learned through machine learning and a set of training data) then this is a good indication that the ball was passed and not kicked, dropped or lost indeterminately. Accordingly there is a high statistical likelihood of that event when that test is successful.

The third test in this example is angular velocity, rotation rate or frequency of rotation. This test is similar to the corresponding possession test. If the ball is initially in a player's possession and then begins to rotate at a high rate, then this is a good indication that the ball was either passed or kicked, rather than dropped, taken or lost through an indeterminate sequence of events.

The angular velocity or rotation rate is compared against a reference value or a plurality of reference values to indicate a statistical likelihood of a particular outcome. For example, an angular velocity higher than a reference value indicates a kick and an angular velocity below that reference value but above a lower reference value indicates a pass. The profile or change in angular velocity may also be compared against a reference, for example to consider the direction component of rotation.

A fourth test considers the acceleration of the ball device and compares the acceleration against a reference or series of references. To determine if the ball was kicked, rather than passed, the magnitude of the ball's acceleration is investigated.

$$|\vec{A}_b| = \sqrt{a_{bx}^2 + a_{by}^2 + a_{bz}^2}$$

If the acceleration magnitude is above the pre-set threshold then the ball is likely to have been kicked since a player cannot accelerate the ball as quickly by passing as they can through kicking. Likewise a high acceleration magnitude rules out the ball having been taken, dropped or lost through an indeterminate sequence of events.

If the magnitude of the ball's acceleration data shows an intermediate acceleration followed by a large acceleration and a high relative velocity, this is a good indication that the ball was drop-kicked by the player.

Alternatively, if the ball shows only an intermediate acceleration, then this may indicate that the ball was dropped.

A fifth test considers elevation position or a change in elevation of the ball device and considers this against a set reference. To determine if the ball was dropped, rather than passed, kicked, taken or lost indeterminately, a test is to examine the ball's height or elevation, which is calculated at a high rate by the radio-beacons. A dropped ball is likely to leave the player's hands and hit the ground. The ball's height (z-position) is therefore likely to decrease to or be below a set tolerance. This is a good indication that the ball was dropped.

However, the acceleration test above also differentiates this situation from a drop-kick.

Therefore to aid the statistical likelihood of a particular outcome, the test compares the elevation of or a change (or magnitude of decrease) in elevation of the ball device against a reference or threshold. Particularly high probabilities result from determining a high magnitude of decrease or a negative change in elevation.

A sixth, preferable, test considers the internal air pressure of the ball. A barometer embedded within the ball monitors the air pressure and transmits the pressure to an external sensor. This test aids in determining if the ball was kicked, rather than passed, and investigates the data from the digital barometer inside the ball over time. This sensor measures the air pressure inside the ball. If the ball is kicked, the internal pressure briefly increases. If the internal pressure increases above a pre-set tolerance then the ball is likely to have been kicked, rather than passed.

In summary, the weighted combination of these various tests results in a real-time categorization given as a probability. Each test is performed and the output parameters weighted and combined to determine the most statistically likely outcome.

Figure 4:
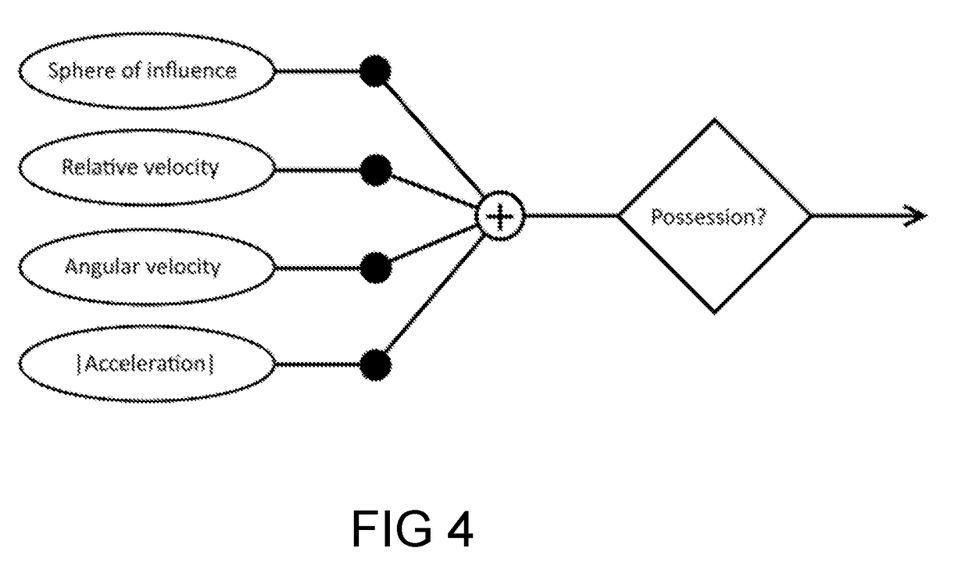
FIG. 4 shows a figurative illustration of an exemplary possession detection method; and, FIG. 5 shows a figurative illustration of an exemplary loss detection method.
Figure 5:
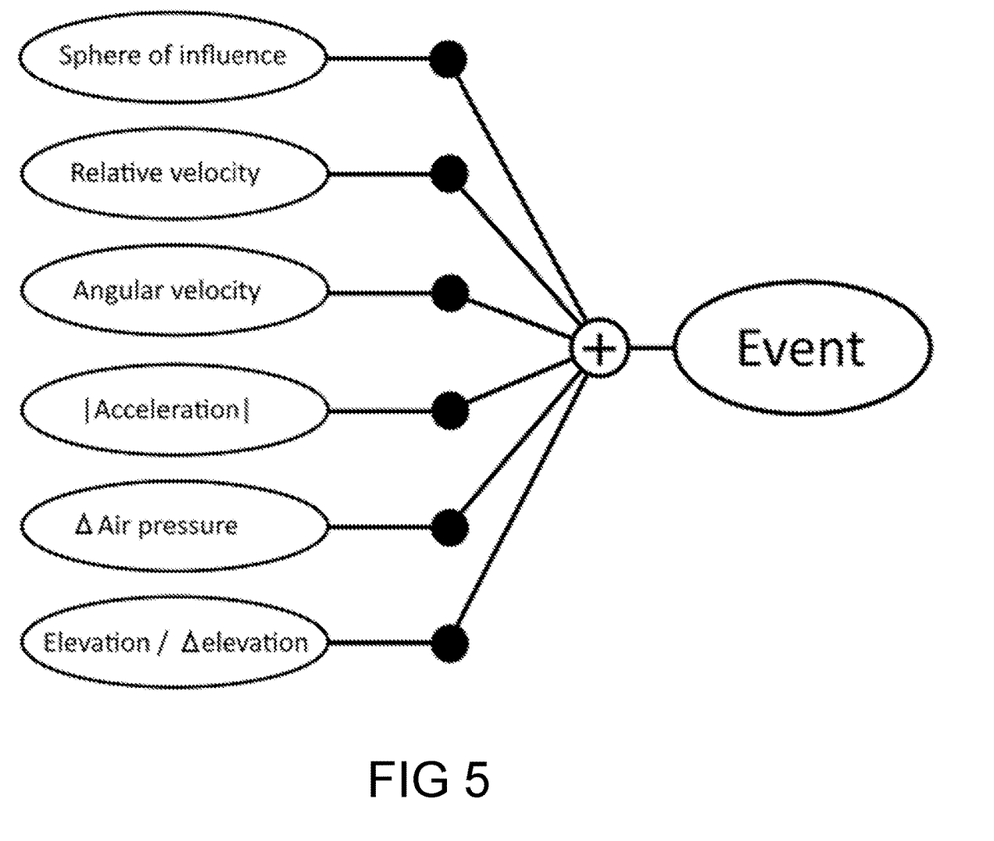

FIG. 4 figuratively illustrates the possession tests being weighted and combined to determine that the player is in the possession of the ball, or not as the case may be. FIG. 5 figuratively illustrates the tests for the categorising loss of the ball being weighted and combined to determine which event is most likely to have occurred.

The following description considers example scenarios of how certain events may be categorised based on the comparison tests described above, each test being performed and combined to gauge the statistical likelihood of a certain event having taken place.

First, the player can pass the ball (in any direction to any other player, even on the opposing team). A pass is statistically likely if:

there was no other player having a sphere of influence overlapping with the ball prior to the event;

the relative velocity between the player and the ball is higher than a first threshold but lower than a second threshold, that is, intermediate;

the angular velocity is higher than a threshold;

the magnitude of acceleration is below a threshold;

the air pressure is consistent over the time period of the event, or below a threshold; and, the elevation of the ball has not decreased significantly, that is the magnitude of a decrease in elevation is below a threshold.

As above, in each test, the threshold or reference value may be optimised to enhance the probability.

Second, the player can kick the ball. A kick is statistically likely if:

there was no other player having a sphere of influence overlapping with the ball prior to the event;

the relative velocity between the player and the ball is higher than a threshold;

the angular velocity is higher than a threshold;

the magnitude of acceleration is higher a threshold;

the air pressure is increased over the time period of the event, or higher a threshold; and, the elevation of the ball has not decreased significantly, that is the magnitude of a decrease in elevation is above a threshold.

Third, the player can drop the ball. A drop is statistically likely if:

there was no other player having a sphere of influence overlapping with the ball prior to the event;

the relative velocity between the player and the ball is lower than a threshold;

the angular velocity is lower than a threshold;

the magnitude of acceleration is lower a threshold;

the air pressure is consistent over the time period of the event, or below a threshold; and, the elevation of the ball has decreased significantly, that is the elevation is below a threshold. For example, the absolute height of the ball is measured above the plane of the field. If the ball goes to near zero, ie, is within, say 20 cm of the ground, then this test is triggered Fourth, the player can have the ball taken from them (by members of their team or the opposing team). A taken event is statistically likely if:

there was another player having a sphere of influence overlapping with the ball prior to the event, the other player and ball remaining with an overlapping sphere of influence once the ball is no longer within the sphere of influence of the player;

the relative velocity between the player and the ball is lower than a threshold;

the angular velocity is lower than a threshold;

the magnitude of acceleration is lower a threshold;

the air pressure is consistent over the time period of the event, or below a threshold; and, the elevation of the ball has not decreased significantly, that is the elevation is above a threshold.

Fifth, the ball can enter into another player's possession through an indeterminate sequence of events (stopped play, handed to player by touch judge or referee, a new ball is brought onto the field etc.). This event is statistically likely if:

there was no other player having a sphere of influence overlapping with the ball prior to the event;

the relative velocity between the player and the ball is lower than a threshold;

the angular velocity is lower than a threshold;

the magnitude of acceleration is lower a threshold;

the air pressure is consistent over the time period of the event, or below a threshold; and, the elevation of the ball has not decreased significantly, that is the elevation is above a threshold.

Sixth, a drop-kick can be determined which is a legal kick where the ball is dropped first prior to being kicked. A drop-kick is statistically likely if:

there was no other player having a sphere of influence overlapping with the ball prior to the event;

the relative velocity between the player and the ball is higher than a threshold;

the angular velocity is higher than a threshold;

the magnitude of acceleration varies from a lower than a threshold to a value higher a threshold;

the air pressure is increased over the time period of the event, or higher a threshold; and, the elevation of the ball has decreased significantly over the time period, that is the elevation is below a threshold.

It was described above that an important outcome of effective event detection is the ability to improve officiating on the sports field. The above tests focus primarily on detecting events of performance tracking and analysis purposes. However, the example system and method described is able to facilitate effective officiating in a contentious area of Rugby—the forward pass. For a human to accurately determine a forward pass, the official must be in line with the pass and make a judgement call on the effect of the momentum of the player on the pass. Video analysis has been used to determine if a pass is forward that resulted in a try-scoring opportunity but even with today's modern replay systems and cameras it remains notoriously difficult for the human eye to identify a forward pass. The event detection system provides a means to reduce the human error and provide a real-time notification of the occurrence of a forward pass.

According to Law 12, a throw forward occurs when a player throws or passes the ball forward, i.e, if the arms of the player passing the ball move towards the opposing team's dead ball line.

The event categorisation solution presented here provides a means to accurately determine if the pass is forward. Once a possession by a player has been identified, a change in possession is watched for. Once a change in possession is identified by a change in the outcome of the possessions tests, the loss detection algorithm aims to identify a forward pass.

First, the method determines the relative velocity between the ball and the player who made the pass. This relative velocity is a vector with magnitude and direction. Next, the method takes the component of this vector along a unit vector which is parallel to the touch line and pointing in the direction of the opposing team's dead ball line.

If this component is positive and above a threshold then the ball is travelling forward relative to the player who passed it. It is therefore a forward pass with some statistical certainty.

For example, if the y-axis of the reference frame is set to the half-way line then the x-axis may be any perpendicular line to that y-axis (the half-way line). A unit vector perpendicular to that y-axis and pointing in the direction of the opposing team's dead ball line is first calculated, that is, the forward-direction component of the relative velocity vector. This vector is compared against a threshold value. If the value is positive and above a threshold then it is an indication of a forward pass. Since the value is of relative velocity, the value may be positive owing to the direction of travel of the player in that direction (perpendicular to the y-axis/half-way line).

Accordingly, much like a pass, a forward pass is statistically likely if:
- there was no other player having a sphere of influence overlapping with the ball prior to the event;
- the relative velocity between the player and the ball is higher than a first threshold but lower than a second threshold, that is, intermediate;
- the angular velocity is higher than a threshold;
- the magnitude of acceleration is below a threshold;
- the air pressure is consistent over the time period of the event, or below a threshold;
- the elevation of the ball has not decreased significantly, that is the elevation is above a threshold; and,
- a direction component of relative velocity is above a threshold, the direction being perpendicular to the half-way line.

Above, it has been described that the output parameters for each test are weighted and combined to determine either likely possession or the likely event, as appropriate. The weights for each parameter may be hardcoded or calculated using a machine learning algorithm. A machine learning algorithm may be trained through simulation of the events and subsequent monitoring to apply a weight to each input parameter to reach the most likely statistical output. There are many machine learning algorithms and it would be well known to the skilled person how to implement such an approach. An example would include an artificial neural network which would take the individual tests as the input layer, learn a hidden layer through appropriate training and map the tests to an output layer which is the most statistically likely event based on those input parameters.

To make effective use of the detecting and event tracking, the event can be output with its associated categorisation. The event can also be stored for subsequent player analysis.

Further, an alert or alarm can be generated depending on the event noted. The events can also be forward to broadcasters or coaches and visually displayed on an appropriate graphical user interface so that the users can instantly identify each event or build up a picture of the events occurred during the course of the game. Should the official require information on the event, the event may be notified to the official using an audible notification or other visual notification via a wearable device such as a wristwatch.

Methods and processes described herein can be embodied as code (e.g., software code) and/or data. Such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

The invention claimed is:

1. A method of detecting and categorising an event occurring on a sports field, the method comprising:
   providing a ball device comprising an antenna connected to a respective transceiver, the ball device configured to be embedded within a sports ball;
   providing an analytics controller operably connected to an analysis server;
   obtaining by the analytics controller a series of ball position data measurements over a time period from the ball device, each measurement in the series being recorded and associated with a time at which it was measured;
   obtaining by the analytics controller a series of player position data measurements over a time period indicating position of a player, each measurement in the series being recorded and associated with a time at which it was measured;
   determining in real time by the analysis server a rotation rate of the ball device over the time period from data received from the ball device;
   determining in real time by the analysis server whether the player is likely in possession of the ball based on a plurality of possession tests comprising:
      comparing a current position of the ball device and the player to identify a relative distance between the ball device and the player and calculating if the relative distance is lower than a reference value;
      comparing an obtained velocity of the ball device and the player, respectively, to identify a relative velocity of the ball device with respect to the player and calculating if the relative velocity is lower than a reference value; and,
      calculating if the rotation rate of the ball device is lower than a reference value.

2. A method according to claim 1, further comprising categorising an event based on a plurality of loss tests comprising:
   comparing a current position of the ball device and the player to identify a relative distance between the ball device and the player and calculating if the relative distance exceeds a reference value;
   comparing an obtained velocity of the ball device and the player, respectively, to identify a relative velocity of the ball device with respect to the player and comparing the relative velocity to a reference value;
   calculating if the rotation rate of the ball device exceeds a reference value;
   calculating if a magnitude acceleration value exceeds a reference value; and,
   calculating if an elevation position of the ball device is lower than a reference value.

3. A method according to any claim 1, in which the step of determining the player is likely in possession of the ball further comprises:
   performing the plurality of possession tests to generate a set of possession parameters;
   applying a weight to the parameters generate a set of weighted possession parameters; and, combining the weighted possession parameters; and,
comparing the combination against a reference value to determine that the ball is possessed by the player.

4. A method according to claim 1, in which the plurality of possession tests comprise:
calculating a player stride rate by monitoring changes in magnitude of acceleration of player device attached to the player;
calculating an estimated player stride rate by monitoring changes in magnitude of acceleration of the ball device; and,
comparing the player stride rate to the estimated player stride rate,
wherein the step of monitoring changes in magnitude of acceleration of the player device and the step of monitoring changes in magnitude of acceleration of the ball device, each comprise receiving data from an inertial measurement unit of the player device and ball device, respectively.

5. A method according to claim 2, in which the method further comprises obtaining air pressure data measurements from a barometer of the ball device, wherein the plurality of loss tests further comprise calculating if the air pressure exceeds a reference value.

6. A method according to claim 1, in which the step of calculating if the relative distance is lower than a reference value comprises applying an offset to the reference value representative of a sphere around the player device and the ball device such that a virtual sphere of influence is created around each device and wherein the virtual spheres overlap if the relative distance is less than a sum of the radii of the two spheres and the reference value.

7. A method according to claim 1, in which the position data measurements are determined from an ultra-wide band signal sent between the player device and the ball device respectively and a plurality of antenna arranged around a periphery of the sports field.

8. A method according to claim 2, in which the step of categorising the event comprises determining a pass event indicated by:
an intermediate level relative velocity above a first reference value and below a second reference value;
a rotation rate above a reference value;
a magnitude of acceleration above a first reference value and below a second reference value; and,
an elevation position of the ball device being above a reference value.

9. A method according to claim 2, wherein the relative velocity is a vector and in which the step of categorising the event further comprises comparing a direction component of the relative velocity vector to a reference value.

10. A method according to claim 9, wherein the relative velocity is a vector and in which the step of categorising the event further comprises determining a forward pass event indicated by:
a direction component of the relative velocity vector being above a reference value, the component of the relative velocity vector being taken along a unit vector which is parallel to the touchline and in a direction of the opposing team's dead ball line.

11. A method according to claim 2, in which the method further comprises receiving a plurality of series of player position data measurements over a time period from a plurality of player devices each attached to a respective sports player, each measurement in the series being recorded and associated with a time at which it was measured, and wherein the step of categorising the event comprises determining a taken event indicated by:
a relative distance of each of a first and second player device and the ball device being lower than a reference value at a first time;
the relative distance of the second player device being higher than a reference value and the relative distance of the second player device being lower than a reference value at a second time later than the first time; and,
the relative velocity of the ball and the first and second player devices being below a reference value at the first and second times.

12. A method according to claim 2, in which the step of categorising the event comprises determining a drop event indicated by:
an elevation of the ball device below a reference value;
a relative velocity below a reference value; and,
a magnitude of acceleration above a first reference value and below a second reference value.

13. A method according to claim 2, in which the step of categorising the event comprises determining a kick event indicated by:
a relative velocity above a reference value;
a rotation rate above a reference value;
a magnitude of acceleration above a reference value; and,
an elevation of the ball device being above a reference value, or determining a drop-kick event indicated by:
at a first time:
an elevation of the ball device below a reference value;
a relative velocity below a reference value; and,
a magnitude of acceleration above a first reference value and below a second reference value; and,
at a second time later than the first time:
a relative velocity above a reference value;
a rotation rate above a reference value;
a magnitude of acceleration above the second reference value; and,
an elevation of the ball device being below a reference value.

14. A system to detect and categorise an event occurring on a sports field, the system comprising:
a ball device comprising an antenna connected to a respective transceiver, the ball device configured to be embedded within a sports ball;
an analytics controller configured to:
detect signals transmitted between the antenna of the ball device and an antenna arrangement comprising three or more antennas, each antenna arranged around a periphery of the sports field;
evaluate the time taken for signals to travel between the antenna of the ball device and the antenna arrangement;
measure position data of the device relative to the antenna arrangement based on time taken; and,
send the position data measurements to an analysis server; and, an analysis server configured to:
determine a rotation rate of the ball device over the time period from data received from the ball device;
determine a player is likely in possession of the ball based on a plurality of possession tests comprising:
comparing a current position of the ball device and the player to identify a relative distance between the ball device and the player and calculating if the relative distance is lower than a reference value;

comparing an obtained velocity of the ball device and the player, respectively, to identify a relative velocity of the ball device with respect to the player and calculating if the relative velocity is lower than a reference value; and, calculating if the rotation rate of the ball device is lower than a reference value.

15. A system according to claim 14 in which the antenna of the device and the antenna arrangement are associated with an ultra-wide band transceiver, wherein the signals transmitted signals are ultra-wide band signals.

16. A system according to any of claims 14 in which the device further comprises an inertial measurement unit (IMU) and which the analytics controller is further configured to determine acceleration and rotation using signals generated by the IMU.

17. A system according to claim 14 in which the position data measurements are determined relative to a reference frame generated by the antenna arrangement.

18. A computer readable medium comprising instructions which, when executed by a processor, cause the processor to perform the method of claim 1.

19. A method according to claim 1, further comprising:
subsequently identifying a change in possession event based on the tests;
categorising the event; and,
outputting a notification of the event and its associated categorisation;
subsequently identifying a change in possession event based on the tests;
categorising the event; and,
outputting a notification of the event and its associated categorisation.

20. A system according to claim 14, further comprising:
a player device comprising an antenna connected to a respective transceiver, the player device configured to be embedded within sports equipment worn by a player on the sports field, wherein
the analytics controller is further configured to:
detect signals transmitted between the antenna of the player device and the antenna arrangement;
evaluate the time taken for signals to travel between the antenna of the player device and the antenna arrangement;
measure position data of the player device relative to the antenna arrangement based on time taken; and,
send the player position data measurements to an analysis server.

* * * * *